Aug. 13, 1946.    J. FERLA    2,405,567
PIPE JOINT
Filed Jan. 27, 1943    2 Sheets—Sheet 1
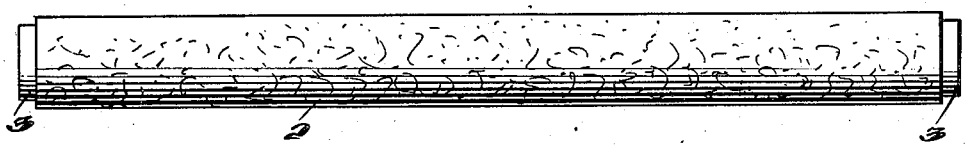
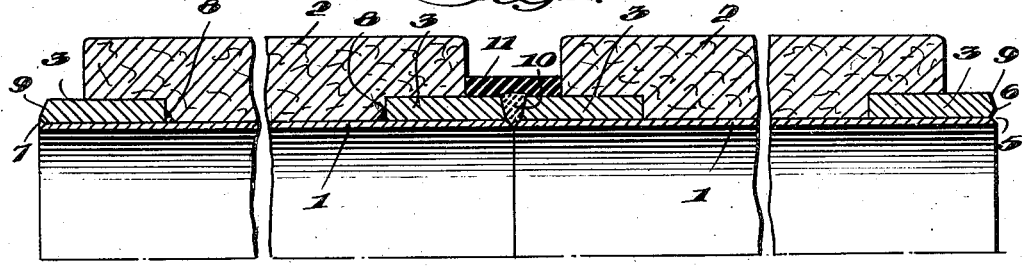
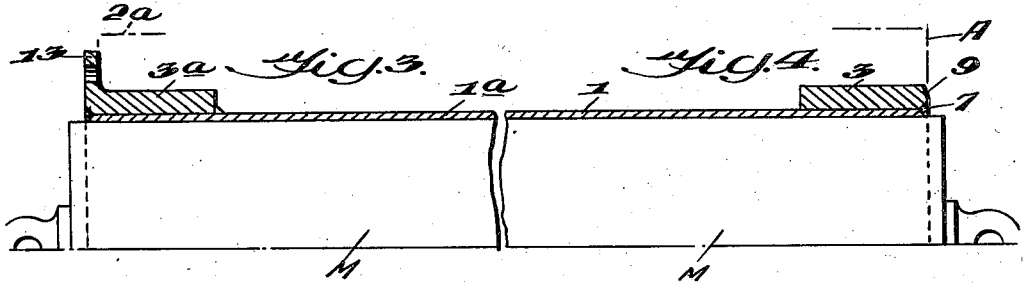
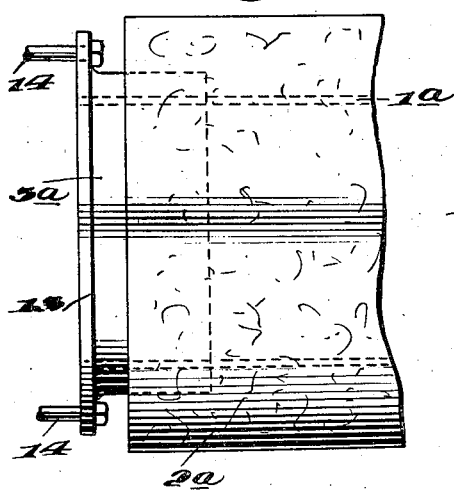
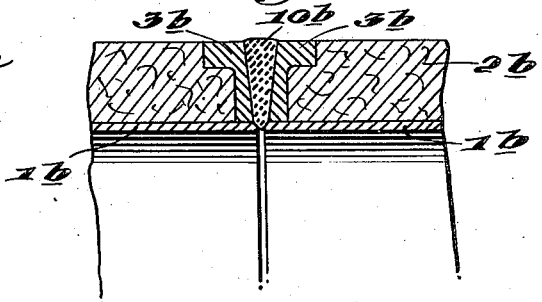
Inventor
John Ferla
By J. Ruston Smecker
his Attorney

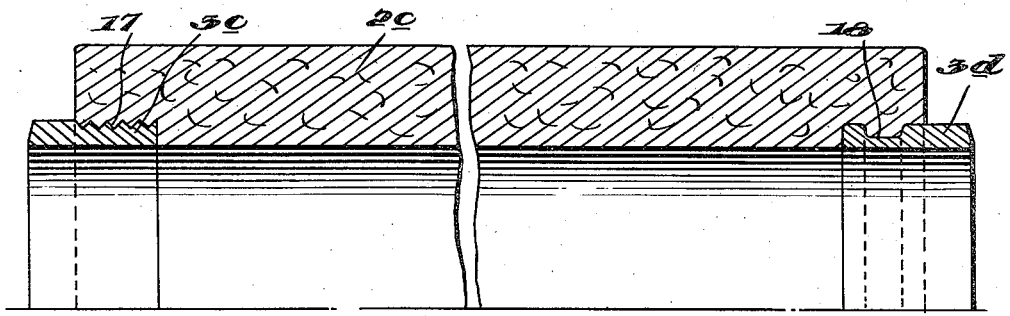
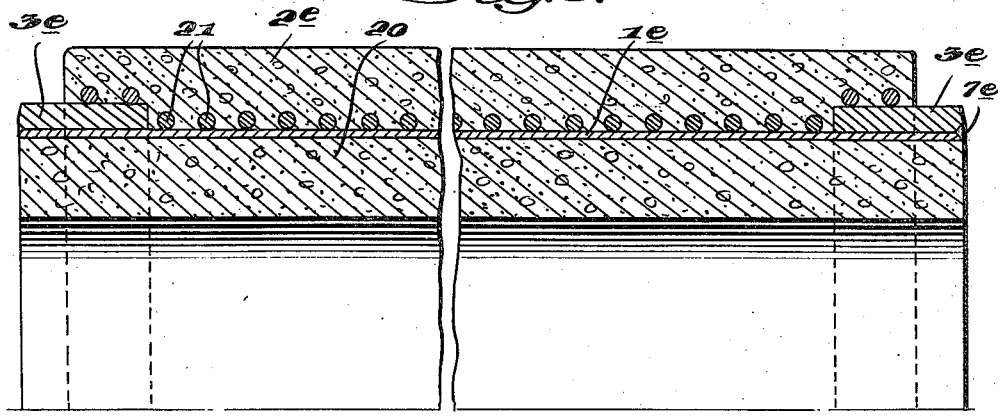

Patented Aug. 13, 1946

2,405,567

UNITED STATES PATENT OFFICE 2,405,567

PIPE JOINT

John Ferla, East Orange, N. J., assignor to U. S. Asbestos Cement Pipe Company, Camden, N. J., a corporation of New Jersey Application January 27, 1943, Serial No. 473,743

4 Claims. (Cl. 285—112)

This application is a continuation-in-part of my prior application on Pipes, Ser. No. 453,447, filed August 3, 1942.

This invention relates to an improvement in pipe joints, particularly joints which are used in connecting together sections of pipes formed of asbestos or other fibrous cementitious material, or other composition, such as concrete, plastic or the like, and with or without a steel or other lining. In my prior application above referred to, I have set forth the construction of an asbestos cement pipe having a thin steel lining, but the joint set forth therein for connecting sections of said pipe is of the character known as a bell and spigot.

The object of this invention is to simplify and improve the joint used in connecting the pipe sections together, and to provide for the use of a minimum of critical materials while preventing leakage at the joint even under high pressures.

This object is accomplished by constructing the pipe so that sections thereof may be welded together at the joint, thus preventing any danger of leakage, and making it impossible to install the pipe in the usual manner of connecting sections of steel pipe and the like, particularly in pipe lines. The thin steel or other lining provided in the pipe makes this suitable and practical for use in oil and gas pipe lines, the steel lining strengthening the composition material as well as preventing penetration of oil and gas therein under high pressure. Such steel lining however does not lend itself readily to the provisions of welded joints between sections of the pipe because of the lack of necessary thickness to hold the weld. My invention contemplates the use of collars around opposite ends of the lining and securely fastened thereto and/or to the composition material of the pipe, to provide sufficient area for a welded joint or an adequate connection between the adjacent ends of pipe connections.

This invention is illustrated in different embodiments thereof, in the accompanying drawings, in which:

Fig. 1 is a side elevation of a pipe made in accordance with this invention;

Fig. 2 is a longitudinal sectional view through pipes joined together, and embodying this invention;

Fig. 3 is a detail longitudinal section through the lining and collar on a mandrel preparatory for manufacture of the pipe;

Fig. 4 is a similar view showing a somewhat different form of collar;

Fig. 5 is a side elevation of an end portion of the pipe having a flanged collar;

Fig. 6 is a detail sectional view through a joint showing still another form of collar;

Figs. 7 and 8 are detailed longitudinal sections showing an unlined pipe with the joint collar; and Fig. 9 is a longitudinal section through a concrete pipe showing the application of this invention thereto.

This invention is shown as applied to a pipe formed of asbestos cementitious material substantially as set forth in my prior application, Ser. No. 184,509, filed January 12, 1938, now Patent No. 2,177,643, granted October 31, 1939. The process thus set forth in said application and patent includes the transfer of a layer of composition material, preferably containing asbestos or other fibers and cement, onto a mandrel, and applying successively additional layers thereto under pressure until the pipe is formed of suitable or desired wall thickness. The asbestos or other fibers distributed uniformly through the cementitious composition, tie these parts together with a very great strength of wall thickness, sufficient for high pressure pipe.

In building the pipe on the apparatus set forth in my prior application, Ser. No. 247,507, filed December 23, 1938, now Patent No. 2,283,921, granted May 26, 1942, a mandrel is used onto which successive layers are applied, which mandrel is shown in Figs. 3 and 4, where it is designated M. This mandrel is first covered by a surrounding shell, shown at 1, that receives the layers of asbestos cementitious composition thereon, and which are applied under continuous high pressure applied to each layer whereby they are bonded to the shell in the manner set forth in the above applications and patents. Where this shell is not to be removed from the formed pipe, its periphery may be roughened somewhat where it contacts the cementitious composition to increase the binding connection thereof with the composition, while the inside of the shell is preferably smooth to prevent friction. The composition material applied to the shell 1 is designated generally by the numeral 2 in Figs. 1 and 2, forming the wall of the pipe.

Where the pipe is to be used for the transmission of oil or gas, such as in a pipe line, the shell being formed of thin metallic material, preferably steel, or other suitable lining material, will remain in the formed pipe and retain its bonded relation to the composition material 2, forming the surrounding wall thereof. The shell will then form a lining for the pipe extending throughout the length thereof, and it will prevent the penetration of the oil or gas into the composition material even under pressure, as well as strengthening the wall structure of the pipe. The lining serves also to prevent any penetration in the pipe when transporting oil or gas therethrough. Any other suitable material may be used as the lining instead of steel, which is of a character impervious to oil or gas to prevent penetration thereof into the composition material, particularly when used under substantial pressures.

The relatively thin section of the lining 1 that is used in the pipe, usually from one-sixteenth to one-eighth inch, does not lend itself to the provision of a welded joint between sections of the pipe, as is often desirable. Accordingly, I have provided a collar 3 on each opposite end of the pipe, of substantial wall thickness, such as approximately three-eighths inch, and formed of a material such as steel, which will permit welding thereof. The collar 3 surrounds the lining 1, fitting directly thereon, and extending back a sufficient distance from the direct end thereof to reenforce said end and to form an adequate connection with the lining. For securely fastening the collar 3 directly to the lining, I preferably bevel the end of the lining as shown at 5, at the right in Fig. 2, and also form an inner bevel on the adjacent edge of the collar 3, as shown at 6. The beveled portions 5 and 6 coact to form a groove at the extreme end of the pipe to permit these parts to be welded together, as shown at 7 in Figs. 2 and 4, the welding material filling the groove and bonding the collar directly to the lining 1. If desired, additional connection may be provided by welding the inner end of the collar to the periphery of the lining, as shown at 8 in Fig. 2. This securely fastens the collar 3 directly to the lining sufficient to form an effective connection therewith.

The outer end of the collar 3 is also preferably beveled as shown at 9, so as to coact with a similarly beveled portion on the adjacent collar when the ends of the pipe are brought into alignment substantially in abutting relation as shown in Fig. 2 to form a groove in the periphery of the pipe ends. This groove permits these ends to be welded directly together, filling this groove with welding material, as shown at 10. The welding may be accomplished in the usual manner of butt-welding seamless tubes and other steel pipes, usually by operating circumferentially around the pipe.

It will be noted in Fig. 2 that the composition material forming the wall of the pipe shown at 2, is spaced back from the edge of the collar 3 a sufficient distance to provide adequate space for accomplishing the welding operation. Initially however, this composition material is molded around the collar directly to the end thereof, as indicated at A in Fig. 4, but after the forming of the pipe and before the composition material has set, it is cut away at the extreme outer edge of the collar, and this portion removed, so as to leave the periphery of the collar exposed at the end of the pipe a sufficient distance back therefrom to facilitate the welding operation. After the welding is accomplished, the groove formed between the composition wall portions 2 at the joint may be at least partly filled with a suitable composition material, tar, or other composition, as shown at 11 in Fig. 2, if desired, particularly to prevent corrosion of the metal and weld, and to prevent electrolysis when the pipe is used in earth subject thereto.

Since the cementitious composition is formed around and directly over the collar 3, the latter will be bonded thereto, as well as fastened to the lining 1, and thus the connection between the adjacent collars will secure effectively the ends of the pipe sections directly together in a simple manner, providing an inexpensive and effective joint for the lined pipe which may be readily applied at the point of use.

Provision may be made for anchoring the collar directly within the wall of the pipe, if desired, as shown in Figs. 7 and 8, to prevent the collars from pulling out or separating from the material. In Fig. 7, the wall 2c, preferably formed of asbestos cementitious material, as described above, has a collar 3c secured in the end thereof, which collar has a series of circumferential grooves 17 in which the cementitious composition is embedded, thus securely anchoring the collar to the wall. In Fig. 8, the collar 3d has one large circumferential groove 18 for interlocking connection with the material of the wall. Thus any desired number of grooves may be used that will provide a secure connection to retain the collars in the wall material, according to the pressures desired within the pipe. Such collars may be welded together in the manner described above and shown in Fig. 2, forming an effective joint connection between the pipe sections.

The collars may be used alone without the lining, as shown in Figs. 7 and 8, for connecting in like manner adjacent end portions of composition pipes, when the lining is not required, and under such conditions the collars will provide an effective joint between the pipes.

It will also be obvious that the lining or shell 1 need not necessarily be formed of steel, as other suitable and available materials may be substituted therefor, such as glass, cellulosic composition, and the like. In the event of the use of such non-metallic materials for the pipe lining, the collar is preferably secured thereto in a suitable manner, as by fusing or adhesion, to prevent separation thereof.

In some instances, it is desirable to provide bolted joints for such pipes, for which purpose, I have shown a collar 3a in Figs. 3 and 5 secured to a lining 1a, and which collar 3a, has a peripheral end flange 13 thereon perforated to receive fastening bolts 14 for anchoring the same to a coacting flange of the joint. The composition wall of the pipe is shown at 2a, which is initially formed against the flange 13 as shown in dotted lines in Fig. 3, but is then cut away to the required extent, as described above, to facilitate the fastening of the joint.

In Fig. 6, another modified form of joint is shown, in which the collar is formed substantially of angle bar material as indicated at 3b, spot-welded or otherwise secured to the lining 1b. The collars on the adjacent sections of pipe are shaped to provide a groove therebetween to receive the welding material 10d which forms the connection between the adjacent ends at the joint. The composition material 2b is formed preferably directly on and bonded to the collar 3b, so the latter will form an effective connection between the pipe ends.

As shown in Fig. 9, the invention is applicable also to concrete pipes in which the wall 2e has an inner concrete lining 20, separated from the wall 2e by a metallic sleeve or lining 1e. If desired, the lining 1e may be surrounded and enclosed by a winding of prestressed wire 21 applied thereover in the usual manner of forming concrete pipes, for reinforcing the pipe. The collars 3e surround the lining 1e and may be welded thereto if desired, as shown at 7e. The formation of the concrete wall 2e around the collars in an overlapping relation, effectively secures these parts together against separation.

I claim:

1. A pipe comprising a surrounding thick wall of asbestos cementitious composition, a thin metallic lining extending throughout the length of said wall and projecting outwardly from opposite ends thereof, cylindrical collars surrounding opposite ends of said lining in interlapping relation with the wall and bonded thereto, said lining having the opposite ends thereof externally beveled, the collars having the outer ends thereof internally beveled, said beveled portions of the lining and collars coacting to form grooves, and welding in said grooves securing the collars on the lining.

2. A pipe joint comprising pipe sections arranged in axial alignment, each of said sections comprising a surrounding wall of non-metallic composition, metallic collars within said walls and bonded thereto, said collars projecting toward each other from the adjacent ends of the walls in edgewise alignment with each other, means forming a peripheral groove in the adjacent ends of the collars, and welding in said groove rigidly securing the collars directly together.

3. A pipe joint comprising pipe sections arranged in axial alignment, each of said sections comprising a surrounding wall of non-metallic composition, metallic collars within said walls and bonded thereto, said collars projecting toward each other from the adjacent ends of the walls in edgewise alignment with each other, means forming a peripheral groove in the adjacent ends of the collars, welding in said groove rigidly securing the collars directly together, and a metallic lining extending through each pipe section and through the collar to the inner end thereof, said collar being welded to said lining.

4. A pipe comprising a tubular thick wall of cementitious material, a thin metallic lining therein, and cylindrical collars surrounding opposite ends of said lining in tight-fitted relation thereon and overlapping the lining throughout the length of each collar, said lining and collars extending beyond the ends of the cementitious material and said collars and lining being bonded to the cementitious material and adapted to be welded together.

JOHN FERLA.